Feb. 4, 1969 SHINTARO HAYASHI 3,425,529
MAGNETIC CLUTCH FOR A CAR COOLER COMPRESSOR
Filed Oct. 3, 1966 Sheet 1 of 2
FIG. 1
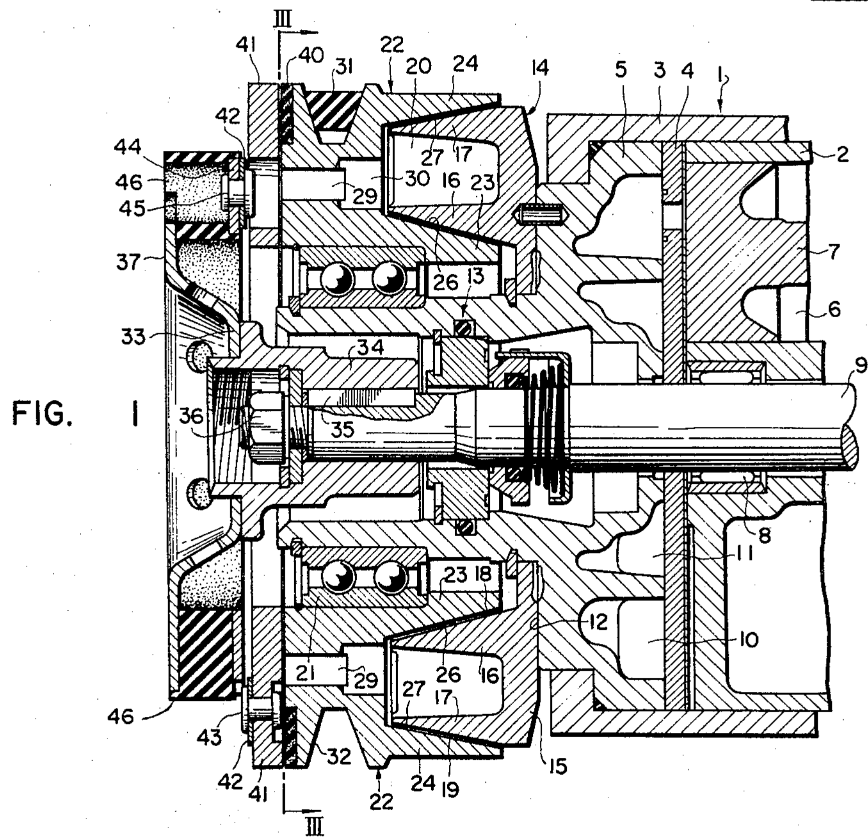
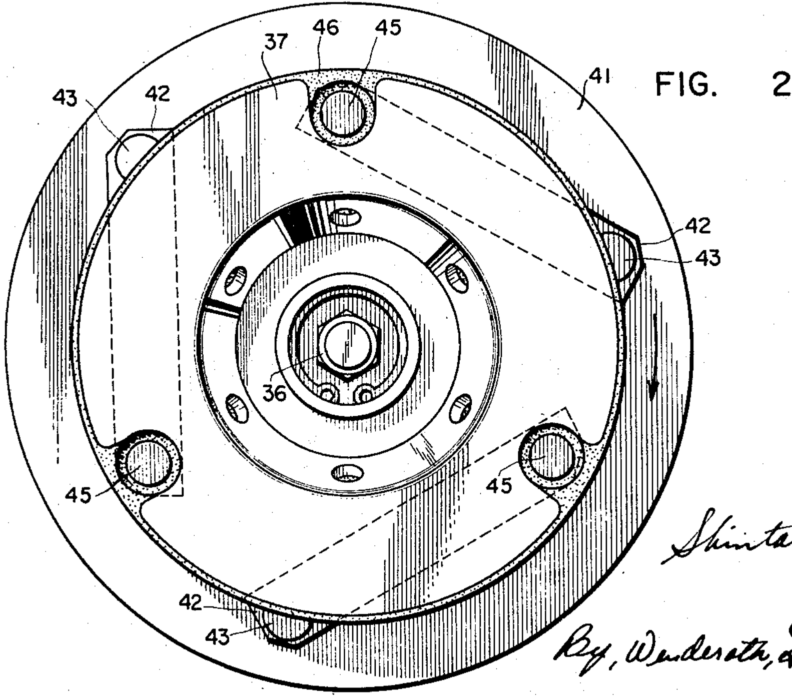
Shintaro Hayashi, Inventor
By, Wenderoth, Lind and Ponack, Attorneys Shintaro Hayashi, Inventor By, Wenderoth, Lind and Ponack, Attorneys

United States Patent Office 3,425,529
Patented Feb. 4, 1969

3,425,529
MAGNETIC CLUTCH FOR A CAR COOLER COMPRESSOR

Shintaro Hayashi, Aichi, Japan, assignor to Toyoda Automatic Loom Works, Ltd., Aichi, Japan

Filed Oct. 3, 1966, Ser. No. 583,734
Claims priority, application Japan, July 7, 1966, 41/44,461
U.S. Cl. 192—84 1 Claim
Int. Cl. F16d *27/04, 13/34, 13/44*

ABSTRACT OF THE DISCLOSURE

An electromagnetic clutch, especially for a driving shaft of a car cooler compressor. The clutch has a rotor having a clutch facing fixed thereto, and a pressure plate operatively connected to a hub on the driving shaft. The rotor has inner and outer annular flanges extending rearwardly and having the opposed faces diverging, and there is provided a stator fixed to a housing and having flanges received in the space between said flanges of the rotor. An electromagnetic coil is positioned in the space between said flanges of the stator. Said magnetic coil is adapted, when energized, to attract said pressure plate against said clutch facing of the rotor into frictional contact therewith.

This invention relates to a magnetic clutch for a car cooler compressor, and one object of the invention is to provide an improved magnetic clutch having an electromagnet coil capable of affording the maximum attractive force for the given diameter of the compressor housing, and aiming to decrease the required magnetic motive force by decreasing the length of magnetic circuit.

Another object of the invention is to provide a magnetic clutch of compact and lighter structure with its diameter minimized. A further object of the invention is to provide a new magnetic clutch, in which a quicker de-clutching may be effected, while on the other hand, desired shock absorbing effect may be realized at the time of starting the operation of the compressor. Other and further objects of the invention will be obvious upon an understanding of the illustrative embodiment about to be described. In the accompanying drawings:

FIG. 1 is a longitudinal sectional view of the front part only of a swash plate type compressor for a car cooler including a magnetic clutch constructed according to the present invention;

FIG. 2 is an end view thereof;

Figure 3:
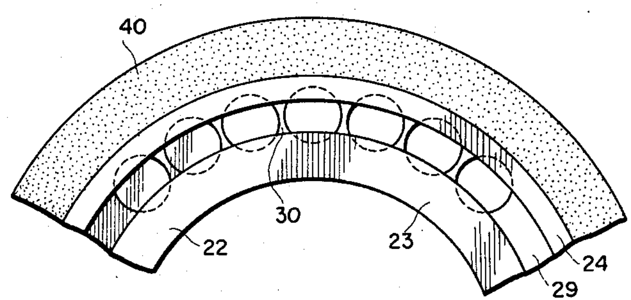
FIG. 3 is an end view taken along the line III of FIG. 1.

Referring to FIG. 1, there is shown the front portion only of a swash plate type compressor, generally designated by reference numeral 1, comprising cylinder blocks 2, a valve plate 4, a shell 3, a front housing 5, a plurality of cylinders 6 supported on needle bearings 8, a driven shaft 9 carrying a swash plate (not shown), and pistons 7 adapted for reciprocal movement in the cylinders 6. The housing 5 is provided with a refrigerant delivery chamber 10 and a suction chamber 11, and is provided with a front end face 12 perpendicular to the driven shaft 9. There is an extension sleeve 13 integral with the housing 5 and concentric with the driven shaft 9. Rigidly secured to the end face 12 of the housing 5, there is a stator 14 having a double annular member concentrically arranged with respect to the shaft 9, and at the rear side 15 it is fixed to the end face 12 of the housing 5. The stator 14 comprises an inner annular flange 16 and an outer annular flange 17, forming therebetween an annular space enclosing an electromagnet coil 20. As viewed in the axial direction, the inner and outer contour faces 18 and 19, respectively, of the stator 14 are tapered or converged toward the front (leftwardly in FIG. 1). The front portion of the extension sleeve 13 is provided with an antifriction bearing 21, on which a rotor 22 is journaled. This rotor 22 consists of a concentrically arranged double annular member comprising an inner annular half 23 and an outer annular half 24. The outer annular half 24 has an annular V-groove 32 for receiving a V-belt 31. The inner annular half 23 and the outer annular half 24 of the rotor 22 are magnetically separated by an annular clearance 29 (FIG. 3), but are physically connected integrally by means of a plurality of radially arranged stays 30. The inner annular half 23 of the rotor 22 has its outer face 26 (FIGS. 1 and 4) tapered in conformity with the inner tapered face 18 of the inner annular flange 16 of the stator 14, and the outer annular half 24 of the rotor has its inner face 27 tapered in conformity with the outer tapered face 19 of the outer annular flange 17 of the stator 14. As will be seen, the taper faces 18 and 19 of the stator 14 are in parallel with the opposed taper faces 26 and 27 of the rotor 22, respectively, and there is a small clearance maintained therebetween. At the front portion of the driven shaft 9, there is securely mounted a boss 34 of a hub 33 by means of a key 35 and a nut 36. The hub 33 is of dish like shape having an outwardly extended peripheral part 37.

40 is a friction plate or clutch facing fixed to the rotor 22, and 41 is a pressure plate acting as an armature adapted to co-operate with said friction plate 40. A plurality of spring straps 42 (three straps in the example shown in FIG. 2) are provided, each strap being extended substantially chordally and being secured at its one end to the pressure plate 41 by means of a rivet 43, and at its other end to the inner side of a spring retaining ring 44 by means of a rivet 45. The ring 44 is connected to the hub extension 37 through a shock absorbing pad 46 made of rubber or other thermoplastic material. Each of said straps 42 is laterally flexible and is extended substantially chordally and, its one end fixed to the pressure plate 41 being located in front with respect to the direction of rotation of the shaft 9. Said spring strap serves dual purpose of acting as a de-clutching spring normally tending to axially move the pressure plate 41 away from the friction plate 40 when the coil 20 is de-energized, and of acting as a driving strap when the pressure plate 41 is attracted by the rotor 22.

The operation of the invention is described as follows: Assuming that the electromagnet coil 20 is not excited, the pressure plate 41 is maintained in the retracted position out of frictional contact with the friction plate 40 on the rotor 22 by the action of the de-clutching springs 42. Thus, the rotor 22 driven from the vehicle engine or any source of power through the belt 31 will be rotated freely around the extension sleeve 13, so that the shaft 9 of the compressor is not driven thereby. When the coil 20 is excited, the magnetic circuit is completed through the annular flange 16 of the stator 14, the annular inner half 23 of the rotor, the pressure plate 41, the outer annular half 24 of the rotor, and the annular flanges 17 and 16 of the stator 14, or vice versa, making frictional contact of the friction plate 40 with the rotor 22, against the action of the de-clutching spring straps 42, whereby the rotation of the rotor 22 is transmitted through the pressure plate 41, the said spring straps 42, now acting as driving straps, and the hub 37 to the shaft 9 of the compressor.

In a conventional device of the similar type, the transmission of power from the pressure plate to the hub of the drive shaft 9 is effected through the push of the driving straps, so that said spring straps are subjected to compressive stress tending to flex laterally, and there would be a tendency of the pressure plate being pressed against the friction plate.

In contradistinction to such conventional device, in the device according to the present invention the spring straps 42 have a tendency of normally de-clutching the pressure plate 41 from the rotor and, upon energization of the coil 20, the transmission of power from the pressure plate 41 to the hub 37–33 is effected through the pull of the spring straps 42, so that said spring straps are subjected to tension, thereby cancelling the de-clutching tendency thereof. Thus, there would unavoidably be some decrease of magnetic attraction force, but this is considered practically negligible. In the present invention, on the other hand, said slight tendency of the spring straps 42 normally to de-clutch the pressure plate 41 from the friction plate 40 would aid the shock absorbing effect upon starting the operation of the compressor, although the insertion of the shock absorbing pad 46 is also intended for shock absorbing purpose. Especially at the time of stopping the operation of the machine, the particular arrangement of said spring straps 42 will be helpful in obtaining quicker de-clutching.

Figure 4:
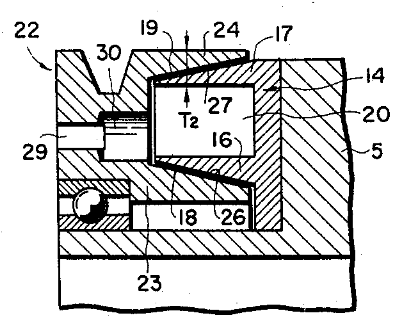
FIG. 4 is a fragmental sectional view of the magnet portion of the electromagnetic clutch of the present invention.
Figure 5:
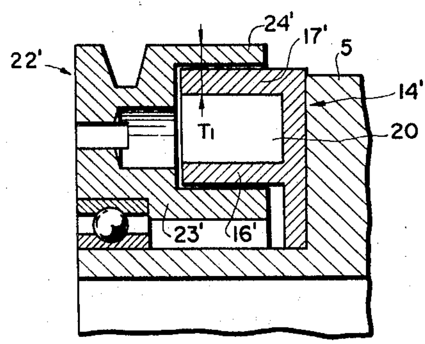
FIG. 5 is a similar view showing the construction of the magnet portion of a conventional magnetic clutch of the similar type.

With respect to the compressor mounted on a various vehicle, it is highly desirable to save weight of various parts as much as possible. For the purpose, according to the present invention, the stator and the rotor enclosing the electromagnet coil 20 may be made considerably lighter in weight as compared with the conventional construction of such parts shown in FIG. 5. In FIG. 5 showing the conventional arrangement, each of the frontwardly extending annular flanges 16′ and 17′ of the stator 14′ are purely cylindrical, and similarly the rearwardly extending annular halves 23′ and 24′ are also of purely cylindrical form. $T_1$ designates the total wall thickness of the outer cylindrical flanges 24′ and 17′ of the rotor and the stator, respectively, plus the clearance between said cylindrical flanges. By comparative observation of FIGS. 5 and 4, in the latter of which the wall thickness of the frontwardly extending annular flanges 16 and 17 is gradually decreasing toward the free ends of the flanges and the wall thickness of the rearwardly extending annular flanges 23 and 24 is gradually decreasing toward the free ends thereof, it will be readily understood that the total wall thickness $T_2$ in FIG. 4 is considerably lesser than the total wall thickness $T_1$ in FIG. 5. As a result of decrease of the total wall thickness of the annular flanges of the stator and the rotor, according to the invention, the diameter of the associated parts as well as of the electromagnet coil 20 has been considerably decreased and, consequently, the magnetic flux density thereof will be increased in inverse proportion to decrease the diameter of the coil.

What I claim is:

1. In a compressor for a car cooler having a driving shaft, and a housing having an extension sleeve fixed to said housing, an electromagnetic clutch which comprises a stator adapted to be securely mounted on said housing and having inner and outer annular flanges, said inner flange having an inner conical face and said outer flange having an outer conical face, an electromagnet coil enclosed between said stator flanges, a rotor adapted to be rotatably mounted upon said extension sleeve and consisting of an annular inner half having an outer conical face complementary to and opposed to the inner conical face on said inner flange and an annular outer half having an inner conical face complementary to said opposed to the outer conical face on said outer flange, said annular halves being magnetically decoupled, and stays physically connecting said annular halves, there being a small clearance between opposed conical faces on the flanges and the rotor halves, a friction plate on said rotor, a pressure plate cooperating with said friction plate, a magnetic flux path being formed extending through the stator, the annular outer rotor half, said pressure plate and said annular inner rotor half, a hub adapted to be fixed to said driving shaft, and a plurality of spring straps connecting said pressure plate with said hub and tending to move said pressure plate away from said friction plate, whereby energization of the coil moves said pressure plate toward said rotor by magnetic force for engaging said friction plate and pressure plate and whereby the outer diameter of said annular outer half of said rotor can be kept to a value only slightly greater than the maximum diameter of said outer flange of said stator.

References Cited

UNITED STATES PATENTS

| | | | |
|---|---|---|---|
| 965,166 | 7/1910 | Dyer. | |
| 1,523,413 | 1/1925 | Gent. | |
| 3,205,989 | 9/1965 | Mantey | 192—84 |
| 3,325,760 | 6/1967 | Bernard. | |

FOREIGN PATENTS

| | | |
|---|---|---|
| 659 | 1/1893 | Great Britain. |
| 22,893 | 11/1915 | Great Britain. |

BENJAMIN W. WYCHE III, *Primary Examiner.*

U.S. Cl. X.R.

192—89